(12) United States Patent
Hsu et al.

(10) Patent No.: US 7,758,193 B2
(45) Date of Patent: Jul. 20, 2010

(54) COOLING STRUCTURE FOR PROJECTION APPARATUS

(75) Inventors: Nien-Hui Hsu, Hsinchu (TW); Sen-Ming Hsu, Hsinchu (TW); Tsung-Ching Lin, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 613 days.

(21) Appl. No.: 11/797,246

(22) Filed: May 2, 2007

(65) Prior Publication Data

US 2007/0258053 A1 Nov. 8, 2007

(30) Foreign Application Priority Data

May 3, 2006 (TW) .............................. 95115700 A (51) Int. Cl.
*G03B 21/18* (2006.01)
(52) U.S. Cl. .......................................... 353/57; 353/58
(58) Field of Classification Search ............. 353/57–61; 362/264, 294
See application file for complete search history.

(56) References Cited

U.S. PATENT DOCUMENTS 6,976,760 B2 12/2005 Ito et al.
7,018,048 B2 3/2006 Ito et al.
7,021,768 B2 4/2006 Fuse et al.
2002/0101570 A1* 8/2002 Fuse et al. ..................... 353/57
2004/0145896 A1 7/2004 Watanabe et al.

FOREIGN PATENT DOCUMENTS

JP 2002107826 A 4/2002
TW I228635 3/2005

\* cited by examiner

*Primary Examiner*—Thanh X Luu
(74) *Attorney, Agent, or Firm*—Bacon & Thomas, PLLC (57) ABSTRACT

A projection apparatus comprises a housing and further comprises a light source, an imaging system, an optical engine, a first blower, and an axial fan installed in the housing, and an air outlet is disposed on the housing. The light source is installed adjacent to the air outlet. The optical engine is installed between the imaging system and the light source. The first blower is installed at one end far away from the air outlet, and an exhaust port of the first blower faces one portion of the light source. The axial fan is installed at one side of the light source installed the first blower, and the light source is positioned between the air outlet and the axial fan. An exhaust port of the axial fan faces the light source, and a suction port of the axial fan is adjacent to the suction port of the first blower.

8 Claims, 6 Drawing Sheets

COOLING STRUCTURE FOR PROJECTION APPARATUS

BACKGROUND OF THE INVENTION

1. Field of the Invention

The present invention relates to a projection apparatus, and more particularly to a projection apparatus with a better cooling effect.

2. Description of Related Art

Figure 1:
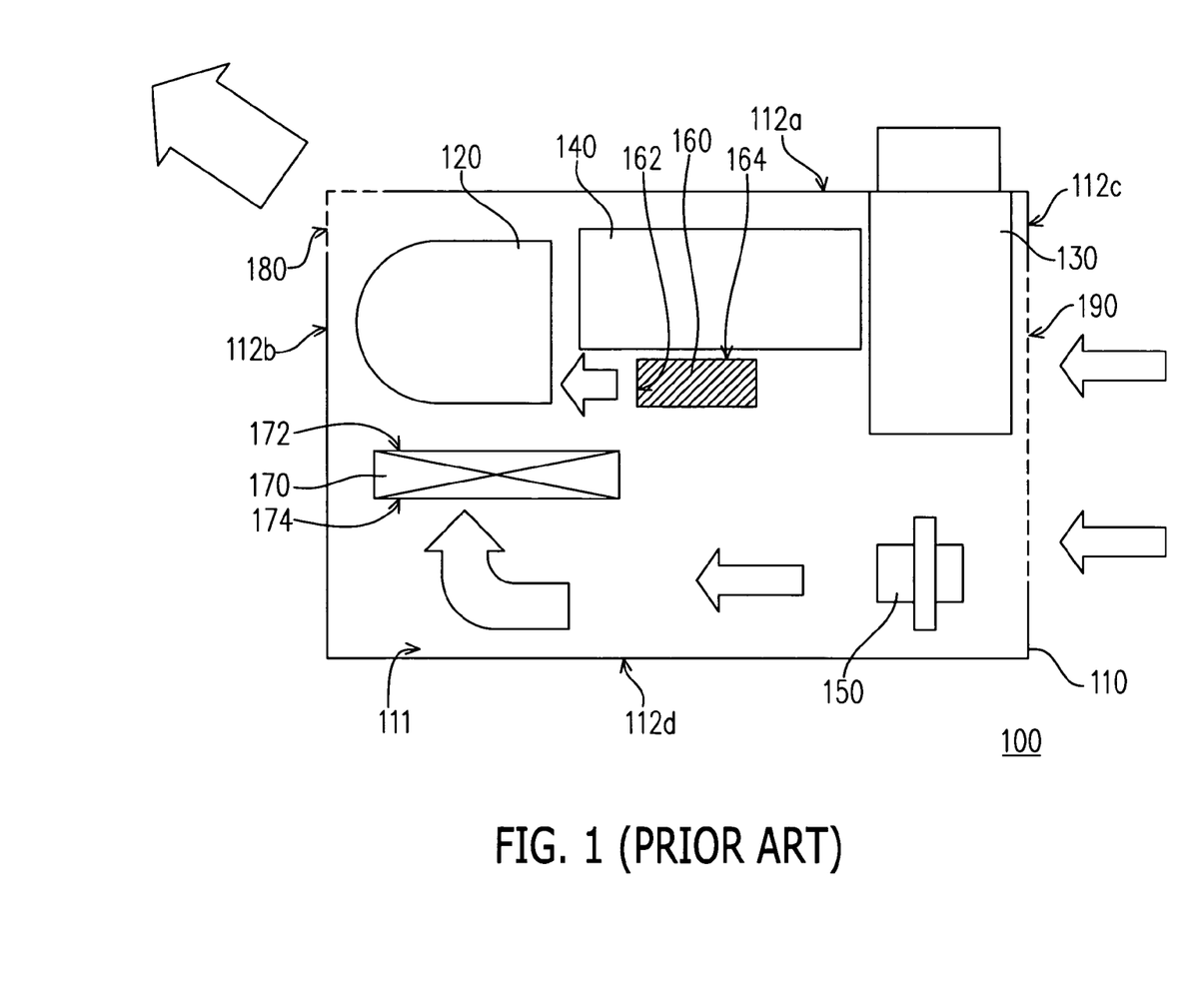
FIG. 1 is a schematic view of a conventional projection apparatus structure.

Please refer to FIG. 1. FIG. 1 is a schematic view showing a conventional apparatus structure. A conventional projection apparatus 100 comprises a housing 110 and a light source 120, imaging system 130, optical engine 140, power supply 150, blower 160 and axial fan 170 installed in the housing 110. The housing 110 is provided with a top plate (upper portion of the housing 110) (not shown in the figure), bottom plate 111 (bottom portion of the housing 110) and a plurality of side walls 112a, 112b, 112c and 112d connected with the top plate and the bottom plate 111. An air outlet 180 is disposed on a corner formed between the side walls 112a and 112b and the light source 120 is installed adjacent to the air outlet 180. The imagining system 130 including, for example, the lens and/or mirrors is installed at a corner between the side wall 112c and the side wall 112a. The optical engine 140 including, for example, lens, rod or light harmonization device, is installed between the imagining system 130 and the light source 120. The power supply 150 is installed at a corner between the side wall 112c and the side wall 112d. Besides, the blower 160 is installed adjacent to the optical engine 140 between the side wall 112d and the light source 120. Furthermore, an air inlet 190 is disposed on the side wall 112c.

The blower 160 has an exhaust port 162 and a suction port 164, in which the exhaust port 162 faces the light source 120 and the side wall 112b, and the suction port 164 faces the optical engine 140 and the side wall 112a. The axial fan 170 has an exhaust port 172 and a suction port 174, in which the exhaust port 172 faces the light source 120 and the side wall 112a, and the suction port 174 faces the side wall 112d.

The light source 120 is driven to illuminate by electricity provide through the power supply 150 in the projection apparatus 100. A light beam emitted from the light source 120 is passed through the optical engine 140 and the imagining system 130 to display an image onto a screen (not shown). The blower 160 and the axial fan 170 are needed to cool the light source 120 since the light source 120 generates a lot of heat when the projection apparatus 100 is operated. In the conventional technology, air outside the housing flows into the projection apparatus 100 through the air inlet 190, the air passed through the power supply 150 to take away the heat from the power supply 150 to decrease the temperature in the power supply 150. Next, the axial fan 170 inhales the air from the power supply 150 via the suction port 174 and expelling the air through the exhaust port 172. The air expelled out from the axial fan 172 passes through the light source 120 and flows out of the projection apparatus 100 through the air outlet 180 such that part of the heat generated from the light source 120 is dissipated out of the projection apparatus 100. The suction port 164 of the blower 160 inhales the air passed through the imagining system 130 and the optical engine 140 and then expels the air via the exhaust port 162. The air expelled from the blower 160 passes through the light source 120 and flow out of the projection apparatus 100 via the air outlet 180 to take away part of the heat from the light source 120 out of the projection apparatus 100.

Accompanying the performance enhancement of the projection apparatus 100, the energy consumption is also increased. For example, for displaying a high brightness images, the power of the light source is increased to elevate the illumination brightness, but the heat generated from the light source 120 and the power supply 150 is also caused to increase so that the original cooling mechanisms cannot decrease the temperature inside the projection apparatus 100 effectively. Therefore, the original speed of the axial fan 170 running higher or replacing a larger axial fan may be required to elevate the cooling efficiency. However, the high speed of axial fan results in a serious noise problem and the larger axial fan increases the dimension of the projection apparatus 100.

Figure 2:
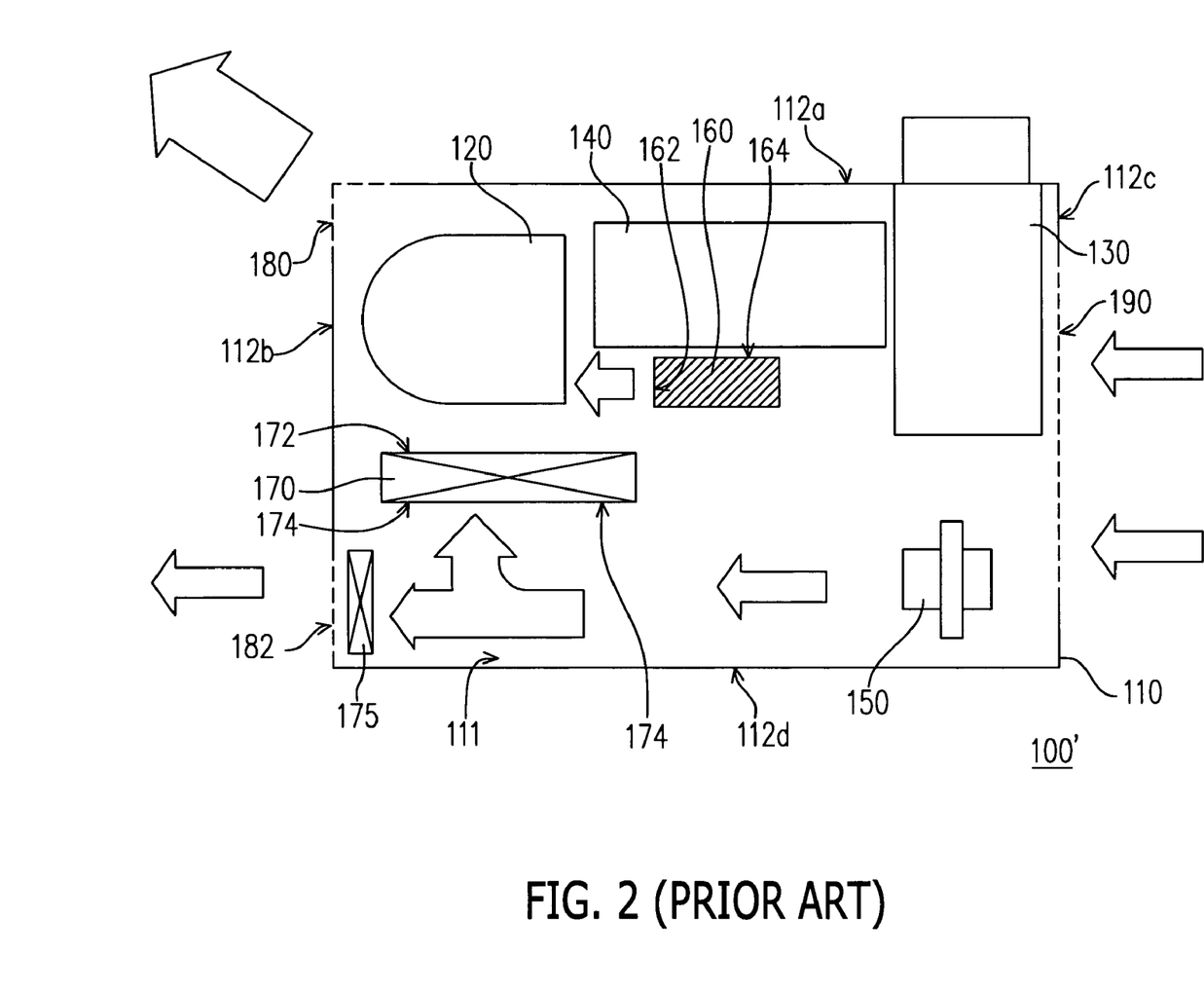
FIG. 2 is a schematic view of another conventional projection apparatus structure.

Please refer to FIG. 2. FIG. 2 is a schematic view showing another conventional projection apparatus structure. The difference between a projection apparatus 100' and the projection apparatus 100 is that another air outlet 182 is disposed on the side wall 112d of the projection apparatus 100' and an axial fan 175 is installed adjacent to the air outlet 182. The axial fan 175 increases the air flow inside the projection apparatus to dissipate the heat from the power supply 150 not the heat from the light source. In this way, the temperature of the projection apparatus 100' is still high.

SUMMARY OF THE INVENTION

For improving the deficiencies, one object of the present invention is to provide a projection apparatus having a better cooling effect.

Other objectives, features and advantages of the present invention will be further understood from the further technology features disclosed by the present invention wherein there is shown and described a preferred embodiment of this invention, simply by way of illustration of one of the modes best suited to carry out the invention.

In order to achieve one, some or all of the aforementioned objects or other objects, the present invention provides a projection apparatus comprising a housing and further comprising a light source, imaging system, optical engine, first blower and axial fan installed in the housing. The housing is provided with a top plate, a bottom plate and a plurality of side walls connected with the top plate and the bottom plate and an air outlet is disposed thereon. The light source is positioned adjacent to the air outlet and the optical engine is installed between the imagining system and the light source. The first blower is installed at one end far way from the air outlet and an exhaust port of the first blower faces the light source. The axial fan is installed at one side of the light source installed the first blower and the light source is positioned between the air outlet and the axial fan. An exhaust port of the axial fan faces the light source and a suction port of the axial fan is adjacent to a suction port of the first blower.

The side walls comprise a first side wall and a second side wall. The first side wall is adjacent to the second side wall, and the air outlet is installed adjacent to a corner formed by the first and the second side walls.

The first blower is installed adjacent to the second side wall. The exhaust port of the blower and the exhaust port of the axial fan face the first side wall.

The side walls comprise a third side wall opposite to the second side wall and an air inlet is disposed on the third side wall.

The imagining system is for example adjacent to the third wall and the first side wall, and a part of the imaging system is exposed at the first side wall.

The projection apparatus further comprises a power supply installed adjacent to the third side wall. The suction port of the first blower faces the power supply and the suction port of axial fan face a fourth side wall opposite to the first side wall so as to inhale air, flowing into the housing via the air inlet and passing through the power supply, from these suction ports and expel the air via the exhaust port of the first blower and the exhaust port of the axial fan respectively.

The projection apparatus further comprises an air duct, one end thereof is connected to the exhaust port of the first blower and another end thereof faces the air outlet.

The projection apparatus further comprises a second blower installed in the housing adjacent to the optical engine. A suction port of the second blower faces the optical engine, and the exhaust port faces the light source.

The light source further comprises a reflector and a lamp installed in the reflector. The exhaust ports of the axial fan and the first blower face an outer portion of the reflector, and the exhaust port of the second blower faces the inner portion of the reflector.

According to the present invention, because the first blower, the second blower and the axial fan are used to increase the air flow in a light source area, the heat generated from the light source can be effectively expelled out of the projection apparatus so as to attain to the cooling effect.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 3:
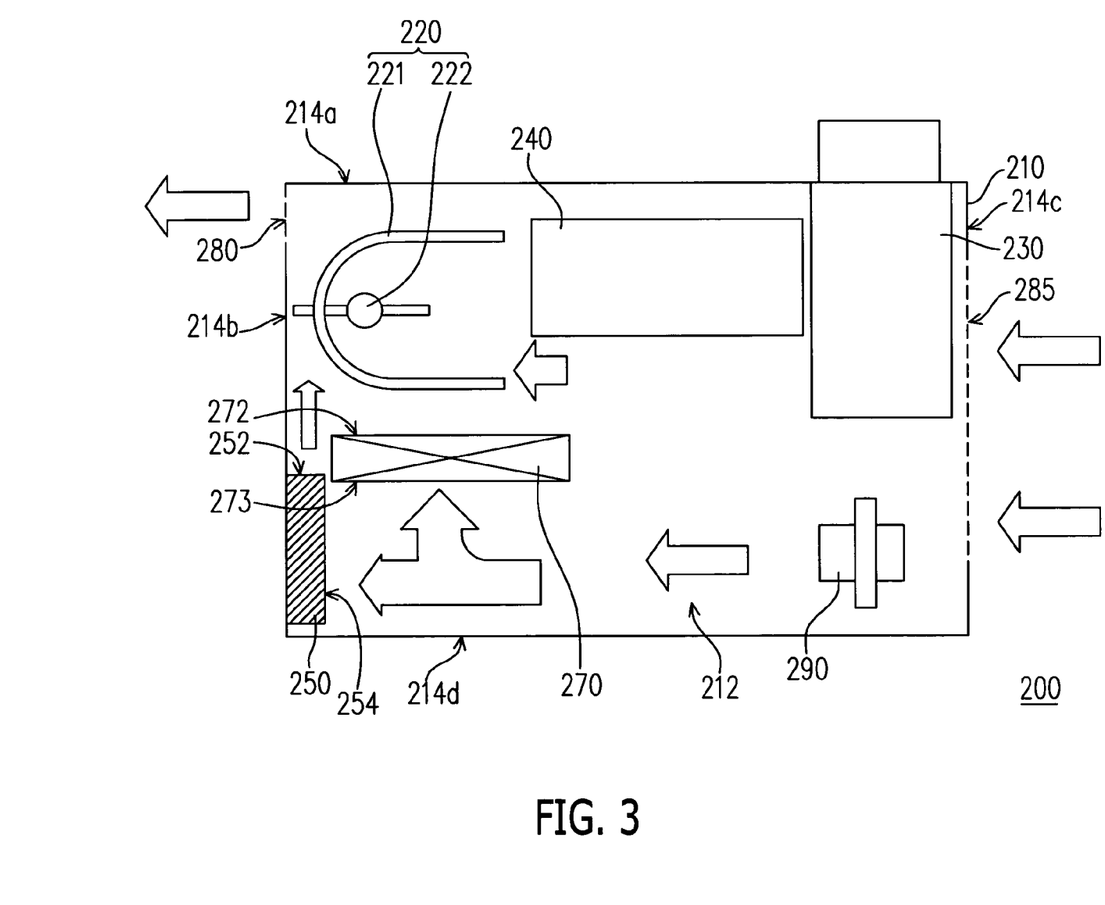
FIG. 3 is a schematic view, showing a projection apparatus of a preferred embodiment according to the present invention.

Please refer to FIG. 3. FIG. 3 is a schematic view showing a projection apparatus of a preferred embodiment according to the present invention. A projection apparatus 200 of the present embodiment comprises a housing 210, a light source 220, an imagining system 230, an optical engine 240, a first blower 250 and an axial fan 270. The housing 210 is provided with a top plate (not shown), a bottom plate 212 and a plurality of side walls connected with the top plate and the bottom plate 212, for example, a first side wall 214a, a second side wall 214b, a third side wall 214c and a fourth side wall 214d, in which the first side wall 214a is adjacent to the second side wall 214b and an air outlet 280 is disposed at a corner formed by the first side wall 214a and the second side wall 214b, as illustrated in FIG. 3 for example. The air outlet (or vent) 280 is constituted, for example, by a plurality of holes or opening. The light source 220 is installed in the housing 210 adjacent to the air outlet 280. The light source 220 comprises a reflector 221 and a lamp installed in the reflector 221. Furthermore, the imaging system 230 is installed in the housing 210 adjacent to the first side wall 214a. The optical engine 240 is installed between the imaging system 230 and the light source 220, and the first blower 250 is installed adjacent to one end of the second side wall 214b far away from the air outlet 280, and an exhaust port 252 of the first blower 250 faces portion of the light source 220 and the first side wall 214a. The axial fan 270 is installed adjacent to the light source 220. The light source 220 is positioned between the first side wall 214a and the axial fan 270. An exhaust port 272 of the axial fan 270 faces the light source 220 and the first side wall 214a.

An air inlet 285, for example, is disposed on the third side wall 214c opposite to the second side wall 214b in the projection apparatus 200. The air inlet 285, for example, is constituted by a plurality of holes or opening. The imaging system 230 comprises a projection lens adjacent to the third side wall 214c and the projection lens is exposed at the first side wall 214a. In one embodiment, a part of the projection lens is exposed out of the first side wall 214a. The projection apparatus 200 further comprises a power supply 290 installed adjacent to the third side wall 214c. A suction port 254 of the first blower 250 faces the power supply 290. For example, a plurality of signal input/output holes 202 are disposed on the fourth side wall 214c opposite to the first side wall 214a so as to connect with other audio-visual products or devices.

The first blower 250 and the axial fan 270 are used for cooling the projection apparatus 200 of the present embodiment so as to decrease the temperature inside the projection apparatus 200. Outside air flows into the projection apparatus 200 via the air inlet 285 of the third side wall 214c, and a part of the air passes through the imagining system 230 to the optical engine 240 and then flows out of the projection apparatus 200 after passing through an inner portion and/or outer portion of the reflector 221 of the light source 220 so as to expel the heat generated from the light source 220 out of the projection apparatus 200.

A part of the air flowing into the projection apparatus via the air inlet 285 first passes through the power supply 290 such that the power supply 290 is cooled so as to decrease the temperature of the power supply 290. The first blower 250 and the axial fan 270 inhale the part of the air through the suction ports 254 and 273 respectively and expel the air via the exhaust ports 252 and 272 respectively. The air expelled by the first blower 250 and the axial fan 270 flows out of the projection apparatus 200 via the air outlet 280 after flowing through an inner portion and/or outer portion of the reflector 221 of the light source 220. The temperature of the air is increased after the air is passed through the power supply 290, but the temperature of the air is still rather low compared with the temperature of the light source 220 so that the air expelled from the first blower 250 and the axial fan can still be used as cooling air for the light source 220.

Compared with the conventional technology shown in FIGS. 1 and 2 that only the exhaust ports 162 and 172 of the blower 160 and the axial fan 170 respectively face the light source 120 in the conventional projection apparatuses 100 and 100', the exhaust ports 252 and 272 of the first blower 250 and the axial fan 270 in the projection apparatus 200 face the area surrounding the light source 220 and the light source 220, the projection apparatus 200 of the present embodiment increase the air flow passed through the light source 220 to decrease the temperature of the light source 220 and the surroundings thereof more effectively to meet the safety regulation requirement.

Figure 4:
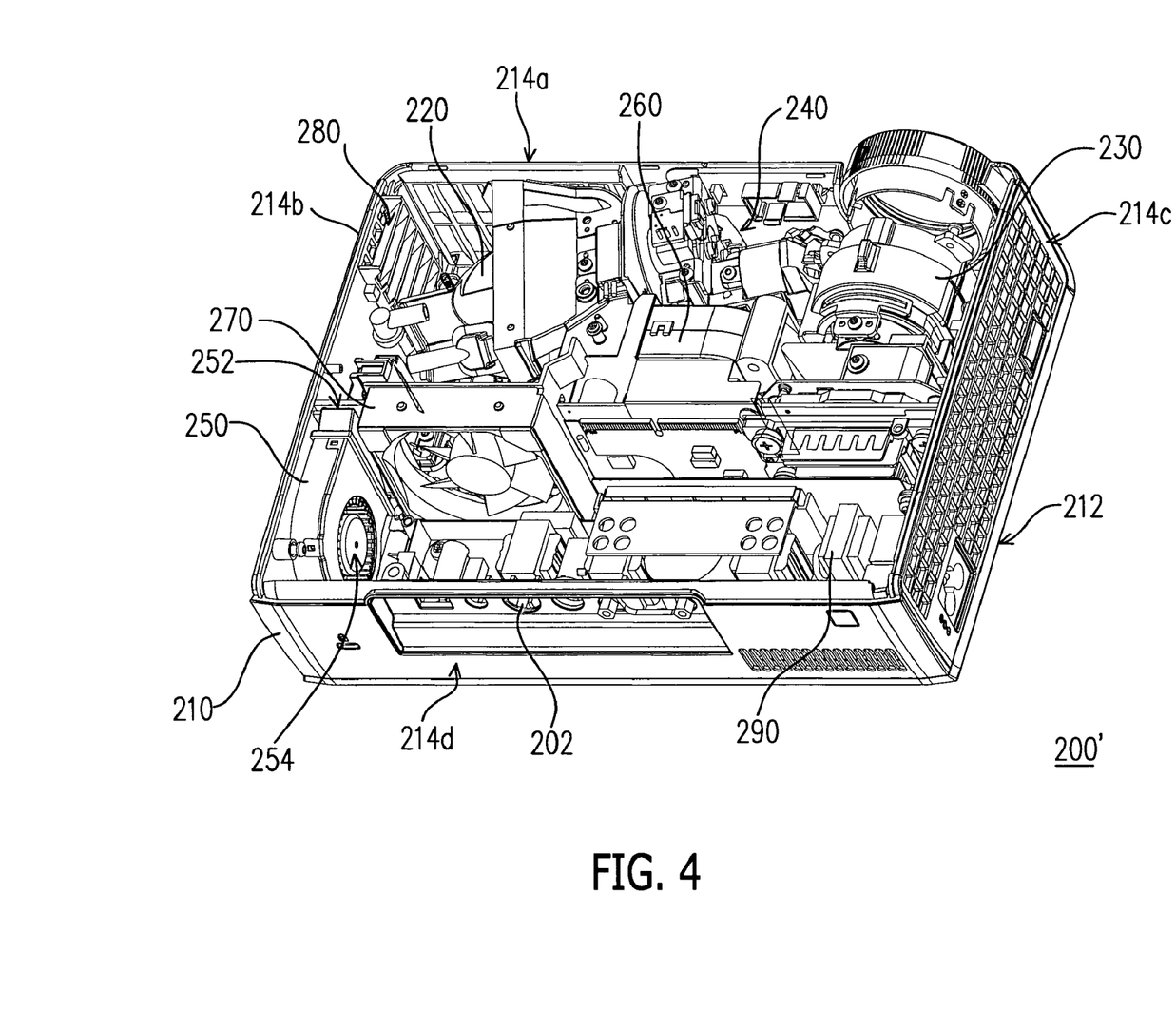
FIG. 4 is a perspective view, showing a projection apparatus of another preferred embodiment according to the present invention.
Figure 5:
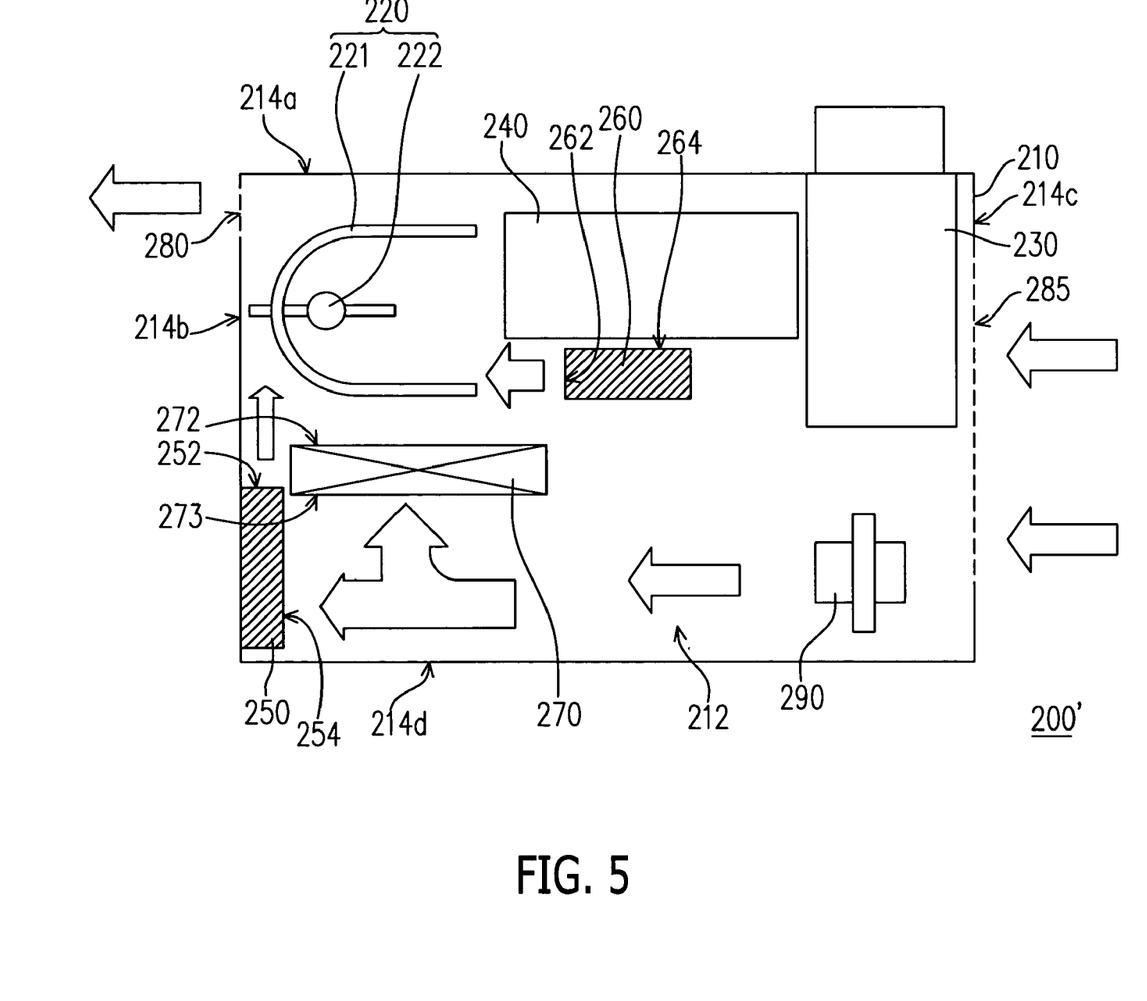
FIG. 5 is a schematic view of a projection apparatus shown in FIG. 4.

Please refer to FIGS. 4 and 5. FIG. 4 is a perspective view showing a projection apparatus of another preferred embodiment according to the present invention and FIG. 5 is a schematic view of a projection apparatus shown in FIG. 4. A projection apparatus 200' of the present embodiment is similar to the projection apparatus 200 shown in FIG. 3. The difference between them is that the projection apparatus 200' of the present embodiment further comprises a second blower 260. The second blower 260 is installed adjacent to the optical engine 240. An exhaust port 262 of the second blower 260 faces the light source 220 and the second side wall 214b, and a suction port 264 of the second blower 260 faces the optical engine 240.

A part of air outside the projection apparatus 200' flowing into the projection apparatus 200' via the air inlet 285 of the third side wall 214c passes through the imaging system 230 and flows to the optical engine 240 to be inhaled by the second blower 260 via the suction port 264. The second blower 260 expels the air inhaled by the second blower 260 via the exhaust port 262 to pass through inner portion and/or outer portion of the reflector 221 of the light source 220 and flow out of the projection apparatus 200 via the air outlet 280. The present embodiment not only uses the first blower 250 and the axial fan 270 to cool the light source 220, but also uses the forced air convection caused from the second blower 260 to enable more air outside the projection apparatus 200' to be blown toward the light source 220 so as to dissipate the heat generated from the light source 220 out of the projection apparatus 200'.

The installment arrangement of the axial fan 270, the first blower 250 and the second blower 260 of the present embodiment increases the flow of the air flowing through the light source 220. It is unnecessary to further increase the rotating speed of the axial fan 270 or use the axial fan 270 with a larger dimension. Therefore, the noise problem caused from raising the rotating speed of the axial fan 270 or the problem of size of the projection apparatus 200 increasing caused from increasing the dimension of the axial fan 270 can be avoided.

Figure 6:
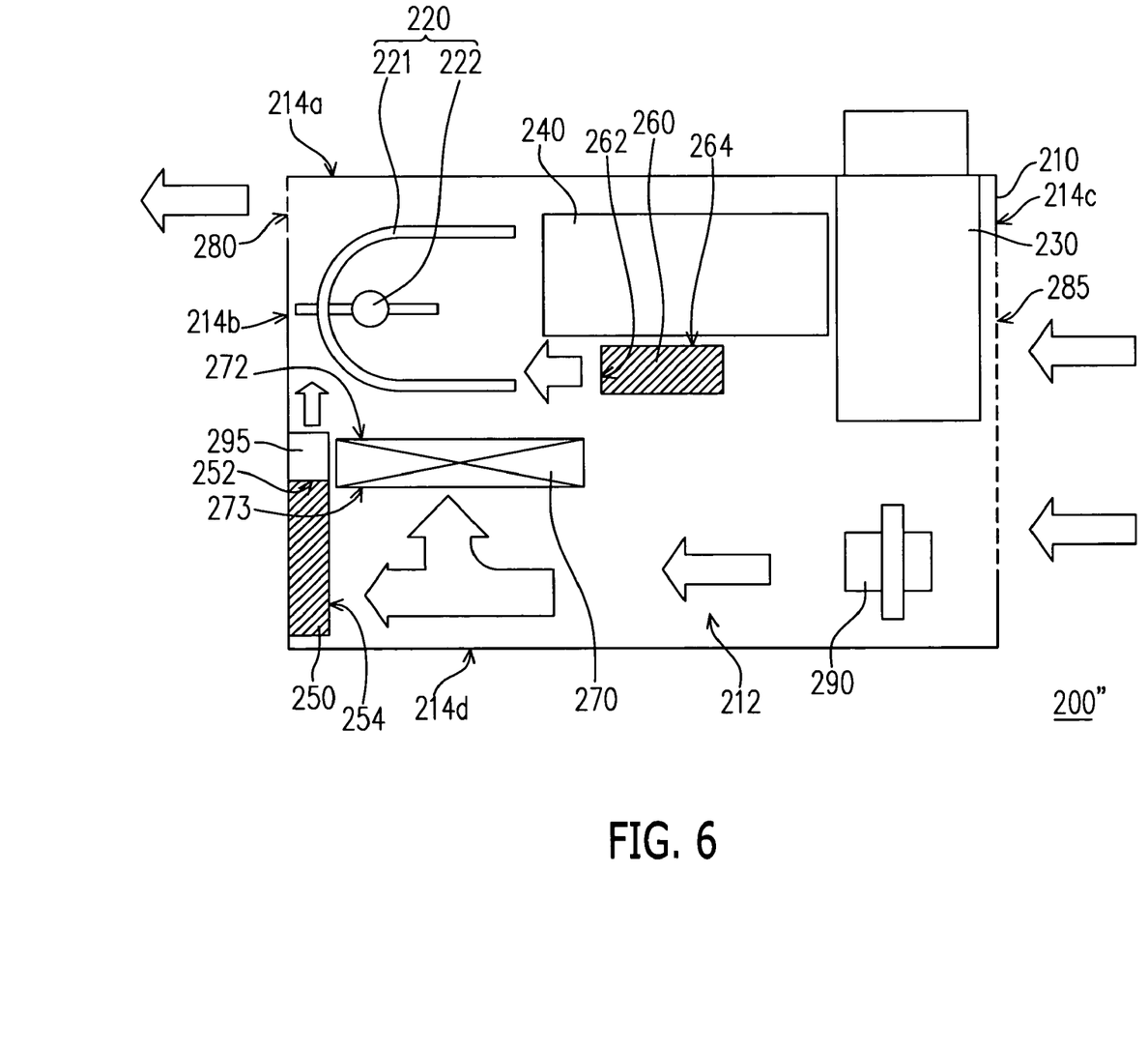
FIG. 6 is schematic view, showing a projection apparatus of still another preferred embodiment according to the present invention.

Please refer to FIG. 6. FIG. 6 is a schematic view showing a projection apparatus of still another preferred embodiment according to the present invention. A projection apparatus 200" of the present embodiment is similar to the projection apparatus 200' shown in FIG. 5, the difference between them is that the projection apparatus 200" of the present invention further comprises an air duct 295. The air duct 295 is installed adjacent to the second side wall 214b between the light source 220 and the first blower 250. The air duct 295 is connected with the first blower 250 and communicated with the exhaust port 252 of the first blower 250.

The air duct 295 can be used as an extension for the exhaust port 252 of the first blower 250. The air expelled from the first blower 250 is allowed to blow toward the area of the light source 220 more concentratively by means of the air duct 295 to adjust the distribution of the exhausted air at the air outlet to enable the temperature distribution to be more uniform. Furthermore, the exhaust air flows out of the housing 210 via the air outlet 280 so that the heat generated from the light source 220 can be effectively dissipated out of the housing 210. Therefore, the projection apparatus 200" of the present embodiment has a better cooling effect.

From the statement, a projection apparatus of the present invention may at least have one of the following merits:
1. The first blower, the second blower and the exhaust port of the axial fan face the light source and the air outlet. The air flow in the light source area can be increased so as to decrease the temperature of the light source and the surroundings thereof effectively and to meet the safety regulation requirement.
2. It is unnecessary to increase the rotating speed of the axial fan or adopt a larger dimension axial fan in the present invention, so that the noise problem caused from raising rotating speed of the axial fan or the problem of size of the projection apparatus increasing caused from increasing the dimension of the axial fan can be avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a housing, provided with a top plate, a bottom plate and a plurality of side walls connected with said top plate and said bottom plate, and an air outlet disposed on said housing;
   a light source, installed in said housing adjacent to said air outlet;
   an imaging system, installed in said housing;
   an optical engine, installed in said housing between said imaging system and said light source;
   a first blower, installed in said housing and at one side of said light source, said first blower located at one end of said housing away from said air outlet, an exhaust port of said first blower facing a portion of said light source; and
   an axial fan, installed in said housing at said one side of said light source, and said light source being positioned between said air outlet and said axial fan, an exhaust port of said axial fan facing said light source, and a suction port of said axial fan being adjacent to a suction port of said first blower,
   wherein said plurality of side walls includes a first side wall, a second side wall, a third side wall, and a fourth side wall, said first side wall is adjacent to said second side wall, said third side wall is opposite said second side wall, and an air inlet is disposed on said third side wall, and
   wherein a power supply is disposed adjacent to said third side wall, said suction port of said first blower faces said power supply so as to receive air that passes over the power supply, and said suction port of said axial fan faces said fourth side wall.

2. The projection apparatus according to claim 1, wherein said air outlet is disposed adjacent to a corner formed by said first side wall and said second side wall.

3. The projection apparatus according to claim 2, wherein said first blower is installed adjacent to said second side wall, and said exhaust port of said first blower and said exhaust port of said axial fan face said first wall.

4. The projection apparatus according to claim 1, wherein said imaging system is adjacent to said third side wall and said first side wall, and a part of said imaging system is exposed at said first side wall.

5. The projection apparatus according to claim 1, wherein said suction port of said first blower and said suction port of said axial fan respectively inhale air after said air flows into said housing via said air inlet and passes through said power supply, and further respectively expel said air via said exhaust port of said first blower and said exhaust port of said axial fan.

6. The projection apparatus according to claim 1, further comprising an air duct, one end of said air duct connected to said exhaust port of said first blower and the other end of said air duct facing said air outlet.

7. The projection apparatus according to claim 1, further comprising a second blower installed in said housing adjacent to said optical engine, an exhaust port of said second blower facing said light source, and a suction port of said second blower facing said optical engine.

8. The projection apparatus according to claim 7, wherein said light source further comprises a reflector and a lamp installed inside said reflector, said exhaust ports of said axial fan and said first blower face an outer portion of said reflector, said exhaust port of said second blower faces an inner portion of said reflector.

* * * * *